United States Patent Office 3,024,294
Patented Mar. 6, 1962

3,024,294
PROCESS AND CATALYST FOR ISOMERIZ-
ING NORMAL PENTANE AND/OR NORMAL
HEXANE
Marcellus J. Geerts, Evanston, Ill., and Norman L. Carr,
Allison Park, Pa., assignors to The Pure Oil Company,
Chicago, Ill., a corporation of Ohio
No Drawing. Filed Dec. 21, 1959, Ser. No. 860,701
19 Claims. (Cl. 260—683.68)

This invention comprises a new and improved process for preparation of a sulfur-resistant catalyst, and more particularly, a process for the catalytic isomerization of n-pentane and/or n-hexane. In particular, this invention is concerned with the preparation of an isomerization catalyst and an isomerization process using said catalyst which effects a high isomerization rate for n-pentane and/or n-hexane while maintaining a substantially zero aging rate for the catalyst using hydrocarbon feeds containing sulfur in an amount which would normally tend to poison the catalyst.

Isomerization has recently come into prominence as a unit process in the petroleum industry for increasing the octane number of low-molecular-weight liquid aliphatic hydrocarbons. In particular, the isomerization of n-pentane and n-hexane has been extensively investigated due to the fact that the isopentanes and isohexanes have substantially higher octane numbers than the corresponding normal paraffins. In the copending patent applications of Hillis O. Folkins et al., Serial No. 765,814, filed October 7, 1958, Serial No. 765,815, filed October 7, 1958, now U.S. 2,943,129, and Serial No. 765,482, filed October 6, 1958, now U.S. 2,943,128, there are described isomerization processes which utilize a solid refractory catalyst consisting of a small amount of palladium supported on an acidic silica-alumina hydrocarbon cracking catalyst containing a small amount of combined fluorine. In the preparation of catalysts in accordance with these copending applications, fluorine is added to the catalyst support as hydrofluoric acid, ammonium fluoride, a fluorinated $C_1$-$C_5$ aliphatic acid, such as trifluoroacetic acid, or precipitated within the support as aluminum fluoride, or zirconium fluoride. In these applications, the processes are described as being applicable to both the isomerization of n-$C_4$-$C_7$ hydrocarbons at temperatures below 800° F. and being highly selective in the conversion of n-pentane and of n-hexane to their respective isomers. Folkins et al. described their isomerization processes in detail and set forth the specific ranges and conditions of temperature, pressure, space velocity, and hydrogen/hydrocarbon mol ratio which are desirable for optimum yields of the $C_4$-$C_7$ isomers and which are necessary to carry out the isomerization process without appreciable amounts of hydrocracking. The incorporation of fluorine into other isomerization catalysts consisting of hydrogenation components, such as nickel, palladium, molybdenum oxide, reduced nickel molybdate, etc., supported on an acidic refractory mixed oxide, such as silica-alumina, is also effective in increasing the catalyst activity for conversion of normal paraffin hydrocarbons into isoparaffins. It has been found, however, that the fluorine-containing isomerization catalysts while being very active for conversion of normal paraffins to isoparaffins are quite sensitive to trace amounts of sulfur in the hydrocarbon feed and decline very rapidly in catalyst activity in the presence of feeds containing as little as 2–4 p.p.m. sulfur. The fluorine-containing isomerization catalysts are also more active in the promotion of undesired side-reactions, such as hydrocracking, than are catalysts which do not contain added fluorine. Process conditions have been developed involving a close control of the isomerization reaction temperature and the partial pressures of hydrogen, and the n-pentane or n-hexane feed, which have overcome the tendency of the fluorine-containing catalysts to decline in activity or age at a rapid rate when used to isomerize low-molecular-weight paraffin hydrocarbons at a high reaction rate. However, these catalysts are still extremely sensitive to very minute amounts of sulfur in the hydrocarbon feed and have required almost total desulfurization of the feed to permit operation of an isomerization process for any substantial length of time without danger of catalyst poisoning.

It is therefore one object of this invention to provide an improved process for the preparation of a highly active, sulfur-resistant, fluorine-containing isomerization catalyst.

Another object of this invention is to provide a highly active, sulfur-resistant, isomerization catalyst capable of effecting the isomerization of n-pentane and/or n-hexane to isoparaffins in high yield without substantial decline in catalyst activity on extended use.

Another object of this invention is to provide an improved process for the isomerization of n-pentane and/or n-hexane using an improved catalyst which is resistant to decline of activity on extended use.

A feature of this invention is the provision of a process for the preparation of a highly active, sulfur-resistant, isomerization catalyst in which a silica-alumina support is treated with anhydrous gaseous hydrogen fluoride at a temperature in the range from 100°–1000° F., excluding the range from 650°–850° F. followed by impregnation of the treated support with a hydrogenation agent and reduction of the hydrogenation agent with hydrogen at an elevated temperature to produce a highly active catalyst.

Another feature of this invention is the provision of an improved isomerization catalyst consisting of a small but effective amount of a hydrogenation component supported on a silica-alumina cracking catalyst which has been treated with gaseous, anhydrous hydrogen fluoride at a temperature in the range from 100°–1000° F., excluding the range from 650°–850° F.

A further feature of this invention is the provision of an improved process for the isomerization of n-pentane and/or n-hexane containing 1–10 p.p.m. sulfur by passing hydrocarbon feed and hydrogen, at isomerization conditions, over a catalyst prepared and activated in accordance with this invention.

Other objects and features of this invention will become apparent from time to time throughout the specification and claims as hereinafter related.

This invention is based upon our discovery that highly active, sulfur-resistant, isomerization catalysts can be prepared by treating an acidic silica-alumina hydrocarbon cracking catalyst, containing 50–95% silica, with gaseous, anhydrous, hydrogen fluoride at a temperature in the range from about 100°–1000° F., excluding the range from about 650°–850° F. The fluorine-containing silica-alumina, which is thus prepared, is subsequently impregnated with a small but effective amount of a hydrogenation component, such as cobalt or nickel, reduced nickel molybdate, molybdenum oxide, or group VIII noble metals, such as platinum, rhodium, and palladium. The fluorine-containing silica-alumina is impregnated with the hydrogenation component in solution, dried, and then activated by reduction with hydrogen at a temperature in the range from about 750°–975° F. When a catalyst is prepared in this manner, it is found that the catalyst is more highly active for isomerizing low-molecular-weight, normal, aliphatic hydrocarbons, such as n-pentane and n-hexane, to the corresponding isomers without rapid and permanent decline in activity resulting from the presence of minute amounts of sulfur in the feed. In fact, catalysts prepared in this manner will tolerate the presence of 1-10 p.p.m. sulfur in the hydrocarbon feed, which sulfur content will rapidly poison isomerization catalysts prepared by conventional processes.

The following non-limiting examples illustrate the preparation and use of catalysts made and used in accordance with this invention, and catalysts made according to other procedures which do not offer the advantages of this invention. The examples therefore are not for the purpose of limiting the invention, but rather for the purpose of demonstrating the scope of the invention.

*Example I*

A 30.4-g. portion of a commercial 75/25 silica-alumina cracking in 1/8" pellet form (which had been previously dried at 400° F.) was dried for about 18 hours at 975° F. in a flow of nitrogen and then treated with a gaseous mixture of 0.1% anhydrous hydrogen fluoride in nitrogen at 975° F. in a Monel reactor. The hydrogen fluoride-nitrogen mixture was passed over the silica-alumina for a period of 4.6 hours to complete the addition of hydrogen fluoride to the support. The fluorided support was heated for an additional 0.9 hour to insure complete reaction. The total flow of the nitrogen-hydrogen fluoride mixture was at the rate of about 13 cu. ft./hour per 50 ml. of silica-alumina. Under these conditions, the silica-alumina contained about 2% combined fluorine and was cooled in a stream of nitrogen and subsequently pulverized to a fine powder. The resulting fluorided, silica-alumina, consisting of 28.9., was impregnated with 30 ml. of an aqueous solution containing 0.52 g. palladium nitrate. The wet mass was dried at 230° F. for 81 hours and then mixed with 1% graphite and formed into 1/8" pellets. A 40-ml. portion of the pellets was activated by heating for 1 hour at 400° F., 1 hour at 550° F., 1 hour at 700° F., and 1 hour at 975° F. in a hydrogen flow of about 0.05 cu. ft./hour per ml. of pelleted charge and for 15 hours at 975° F. in hydrogen flowing at about ½ the previous rate. The fluorine content of the final catalyst was 2% and the palladium content was 0.65% wt.

A portion of this catalyst was used in the isomerization of technical-grade n-pentane, consisting of 96% n-pentane, 2-3% cyclopentane, and 1-2% n-hexane. The technical-grade n-pentane and hydrogen were passed over the catalyst at a hydrogen/hydrocarbon mol ratio of 1.3, liquid weight hourly space velocity of 25, a total pressure of 520 p.s.i.g., and reaction temperature of 750° F. The reaction rate constant K for the catalyst under these conditions was 21.5. The reaction rate constant K is a pseudo first-order rate constant and is expressed in accordance wit the equation:

$$K = (\text{LWHSV}) \ln\left[\frac{1}{1-\frac{x}{62}}\right]$$

where LWHSV is the liquid weight hourly space velocity and $x$ is the percent isopentane yield. The rate constant K, as used throughout the specification, provides a basis for comparison of catalyst activity under different conditions of temperature, space velocity, etc.

In another experiment, a 75/25 silica-alumina cracking catalyst was dried and then treated with an aqueous solution of hydrofluoric acid containing palladium chloride, in a concentration sufficient to produce a palladium content of 0.65% wt. and a fluorine content of 2% in the finished catalyst. The impregnated catalyst was dried and reduced with hydrogen at a temperature in the range from about 750°-975° F. The catalyst thus prepared was used in the isomerization of technical-grade n-pentane under substantially the same conditions described above and a rate constant K of 15.7 was determined for the catalyst. When the catalysts prepared in accordance with this example are used in the isomerization of n-pentane or n-hexane containing 1-10 p.p.m. sulfur, under conditions of temperature and pressure which produce a maximum reaction and minimum catalyst aging rate, it is found that the catalyst prepared using aqueous hydrofluoric acid declines rapidly in activity while the catalyst prepared using anhydrous, gaseous hydrogen fluoride remains substantially constant in activity.

*Example II*

A commercial 75/25 silica-alumina cracking catalyst, previously dried at 400° F., was pelleted and dried further for about 18 hours at 500° F. The resulting catalyst (93.8 g.), in pellet form, was subsequently treated with a total amount of 9.1% (referred to the dried support) of anhydrous hydrogen fluoride in nitrogen at 500° F. in a stainless-steel reactor. The hydrogen fluoride was circulated over the catalyst support in admixture with nitrogen in a concentration of about 1% for a period of about 1.9 hours. The flow rate of the nitrogen-hydrogen fluoride mixture was about 10 cu. ft./hour per 50 ml. of silica-alumina. The resulting product (90.9 g.), containing 9.0% fluorine, was cooled in a nitrogen atmosphere and pulverized into a fine powder.

A 45.5-g. portion of the powdered silica-alumina (containing 9% combined fluorine) was impregnated with 45 ml. of an aqueous solution containing 0.80 g. palladium nitrate. The wet mass was dried at 230° F. for 18 hours. The dried product was mixed with 1% graphite and formed into 1/8" pellets. The resulting catalyst was activated by reduction with hydrogen following the procedure described in Example I for the anhydrous hydrogen fluoride-treated catalyst so that the final catalyst had a combined fluorine content of 8.5%.

A portion of this catalyst was evaluated in the isomerization of technical-grade n-pentane at 750° F., 520 p.s.i.g., hydrogen/hydrocarbon mol ratio of 2.5, and liquid weight hourly space velocity of 25. Under these conditions, the reaction rate constant K for the catalyst was 26.0. When a catalyst prepared as in Example I was re-evaluated under these isomerization process conditions, the rate constant K was found to be 18.6.

*Example III*

A commercial 75/25 silica-alumina cracking catalyst, previously dried at 400° F., in pellet form (totaling 68.7 g.) was further dried for about 18 hours at 975° F. in a nitrogen flow. This catalyst was treated with 2% (referred to the dried support) of anhydrous hydrogen fluoride in nitrogen at 975° F. in a Monel reactor. The hydrogen fluoride was passed over the catalyst in the form of a mixture of 0.55% hydrogen fluoride in nitrogen for a period of 1.6 hours, followed by heating for 1.7 hours to effect completion of reaction. The nitrogen-hydrogen fluoride mixture was passed at a rate of 10.5 cu. ft./hour per 50 ml. of catalyst. The resulting catalyst support, containing about 2% fluorine, was cooled in a nitrogen flow and pulverized.

The resulting silica-alumina support (63.7 g.) was impregnated with 60 ml. of aqueous solution containing 1.2 g. palladium nitrate. The resulting wet mass was dried for 16 hours, mixed with 1% graphite and formed into 1/8" pellets. A 47-ml. portion of the pellets was activated by reduction with hydrogen following the procedure described for the catalyst prepared from the anhydrous hydrogen-fluoride treated support in Example I. The fluorine content of the resulting catalyst was about 2% and the palladium content was about 0.65% wt. A part of this catalyst was treated with hydrogen at a rate of 1.7 cu. ft./hour at 700° F., 800° F., 900° F., and 975° F. for 15 minutes at each temperature, and with 5 cu. ft./hour of hydrogen at 975° F. until the effluent gas contained less than 200 p.p.m. of water. The temperature was then reduced to 750° F. and the sample was exposed to a gaseous mixture of hydrogen and hydrogen sulfide (containing about 77% vol. of hydrogen sulfide) for 2 hours. The sample was finally purged at 750° F. with 5 cu. ft./hour of hydrogen for 10 hours and was cooled under a trickle flow of hydrogen.

The activity of the catalyst before and after treatment with hydrogen sulfide was determined under the reaction conditions used in evaluating the catalysts of Example I. The rate constant K for the catalyst prior to treatment with hydrogen sulfide was 19.9 and after treatment with hydrogen sulfide was 21.3. A catalyst prepared using aqueous hydrofluoric acid as described in Example I was exposed to a hydrogen sulfide-hydrogen atmosphere as described in this example and evaluated under the conditions described in Example I for the isomerization of technical-grade n-pentane. The catalyst prepared using aqueous hydrogen fluoride suffered a 30–50% decline in activity after treatment with the hydrogen sulfide-containing gas.

Additionally, a portion of the catalyst prepared using aqueous hydrofluoric acid was evaluated using a technical-grade n-pentane feed containing about 5 p.p.m. sulfur (in the form of dimethyl sulfide) under reaction conditions which produce no catalyst aging with a feed having a sulfur content less than 1 p.p.m., and was found to decline in activity at the rate of 5.8 yield units (percent) per 100 hours of operation. This catalyst aging rate is extremely high and cannot be tolerated in a commercial process which must operate for many months without replacement of the catalyst. The catalyst prepared using the anhydrous hydrogen fluoride-treated support does not decline in activity with a feed containing 5 p.p.m. sulfur and is highly resistant to sulfur contents as high as 10 p.p.m. sulfur.

Example IV

A 46.0-g. portion of a commercial 87/13 silica-alumina cracking catalyst (previously dried at 400° F.) in pellet form was further dried for about 18 hours at 750° F. under a nitrogen flow. The dried silica-alumina was then treated with 2% anhydrous hydrogen fluoride (referred to the dried support) at 750° F. in a Monel reactor. The hydrogen fluoride was circulated over the catalyst in the form of a mixture of hydrogen fluoride (0.5% vol.) with nitrogen for a period of 1.6 hours at a flow rate of 10 cu. ft./hour per 50 ml. of silica-alumina. The fluorine-treated catalyst was heated for 1.4 hours after addition of the hydrogen fluoride was complete to insure completion of reaction. The catalyst support, containing about 2% combined fluorine, was cooled under nitrogen flow and pulverized. The resulting catalyst support (44.4 g.) was impregnated with 50 ml. of aqueous solution containing 0.80 g. palladium nitrate. The impregnated mass was dried at 230° F. for 74 hours, mixed with 1% graphite, and formed into 1/8" pellets. All of the pelleted material was activated by the method described in Example I, whereupon the activated catalyst contained about 2% fluorine and 0.65% wt. palladium.

A portion of this catalyst was treated with hydrogen sulfide-hydrogen gas mixture as in Example III, except that the glass reactor containing the catalyst sample was inserted directly into a furnace at 975° F. instead of being heated gradually. The catalyst activity before treatment with hydrogen sulfide was determined using technical-grade n-pentane under isomerization reaction conditions as used in Example I. The catalyst had a reaction rate constant of 21.1 After treatment with hydrogen sulfide, the catalyst activity was determined under the same isomerization conditions and the reaction rate constant was determined to be 26.1.

It is apparent from these two examples that the initial exposure of the catalysts of this invention to thermal treatment at 975° F. in preparation of treatment with hydrogen sulfide was not detrimental to activity. The hydrogen sulfide-treated catalyst was shown to be substantially greater in activity than the virgin catalyst. When a palladium on silica-alumina catalyst containing no combined fluorine is exposed to a temperature of 975° F. for an extended period, it declines in activity by about 15–20%. Thus, it is seen that the catalysts prepared in accordance with this invention exhibit a resistance not only to sulfur poisoning, but also to thermal deactivation.

Example V

In a series of experiments, catalysts were prepared consisting of about 0.65% wt. palladium on 75/25 silica-alumina. A catalyst of this composition was prepared containing no fluorine and evaluated for catalyst activity at 755° F. The reaction rate constant was found to be 13.0. Another catalyst was prepared in which the catalyst support, prior to impregnation with palladium, was treated with anhydrous gaseous hydrogen fluorine at 500° F. The catalyst support contained 9% combined fluorine and the resulting catalyst had a reaction rate constant at 755° F. of 26.0. A third catalyst was prepared in the same manner, except that the anhydrous, gaseous hydrogen-fluoride treatment was carried out at 750° F. The catalyst support contained only 3.6% combined fluorine and the resulting catalyst had a reaction rate constant of only 10.5. A fourth catalyst was prepared following the same procedure, except that the hydrogen-fluoride treatment was carried out at 975° F. This catalyst support contained 2.0% combined fluorine and the final catalyst prepared from it had a reaction rate constant K of only 18.5. From these examples, it is seen that catalysts which are prepared by treatment of silica-alumina with anhydrous gaseous hydrogen fluoride at elevated temperatures have increased catalyst activity and increased resistance to sulfur poisoning and thermal deactivation. The treatment with anhydrous gaseous hydrogen fluoride must be carried out in the temperature range from about 100°–650° F. or from about 850°–1000° F. In the temperature range from about 650°–850° F., there is an unexplained deactivation of the catalyst. The preferred temperature range for treatment of the catalyst support with anhydrous gaseous hydrogen fluoride is from about 250°–500° F. since maximum catalyst activity for the resulting catalyst is obtained under these conditions.

The hydrogen fluoride is preferably added in admixture with an inert diluent gas, such as nitrogen, in a concentration in the range from about 0.01–2.0% vol. hydrogen fluoride in the inert gas, with the total amount of hydrogen fluoride contacted with the gas corresponding to the maximum amount of fluorine which can be combined with the support at the reaction temperature used. The amount of fluorine combined with the catalyst support varies from 1 to about 10% wt., depending upon the temperature at which the hydrogen-fluoride treatment is carried out. The catalyst-support material can be treated in a continuous manner utilizing conventional apparatus. For example, nitrogen is passed through a furnace, heated to the desired reaction temperature, and mixed with anhydrous, gaseous hydrogen fluoride. The heated mixture is passed through a venturi-shaped nozzle having an aspirator tube arranged to draw powdered silica-alumina from storage and mix the powder with the gases at the venturi throat. The gas, containing entrained silica-alumina, is passed through a heated reaction tube (having a residence time of 1–60 sec.) and into a cyclone separator where the fluorided silica-alumina is recovered and the nitrogen and unreacted hydrogen fluoride is either exhausted or recycled.

The reason for the increase in catalyst activity and resistance to thermal deactivation and sulfur poisoning is not known. However, it is believed that the catalyst activity is due to the presence of a large number of highly active sites for catalytic contact with the hydrocarbon/hydrogen feed, and that this method of incorporation of fluorine into the catalyst support in the preliminary processing of the support provides a large number of more active catalyst sites which are especially resistant to sulfur poisoning. Since the treatment which is given in accordance with this process is of the support prior to incorporation of the hydrogenation component, it is apparent that this treatment is effective in enhancing the catalytic acivity and sulfur resistance of the catalyst support independently of the type of hydrogenation component used. Therefore, it is possible to use this procedure in the preparation of fluorine-containing isomerization catalysts in which hydrogenation components other than palladium are used. In such a case, a hydrogenation component, such as rhodium, platinum, nickel, molybdenum oxide, nickel molybdate, etc., is incorporated into the fluorided catalyst support and the impregnated catalyst dried and activated by reduction with hydrogen at an elevated temperature. Catalysts which are prepared in this manner, consisting of an acidic silica-alumina treated with hydrogen fluoride in the gas phase at an elevated temperature, and impregnated with a hydrogenation component and activated by reduction with hydrogen, may be used in the isomerization of lower aliphatic hydrocarbons, particularly n-pentane and n-hexane. The hydrogenation-agent content of the catalyst is somewhat variable in accordance with the type of catalyst prepared and may vary from as little as 0.1% to as much as 10%. In the case of group VIII noble metal promoters, the hydrogenation component or catalyst promoter is added in an amount ranging from about 0.1–1.0%, preferably about 0.3–0.8% wt. in the case of palladium. Hydrogenation agents consisting of base elements or their compounds, such as nickel, cobalt, nickel molybdate, molybdenum oxide, etc., are used in a higher concentration and are usually present in the amount of about 0.5–10%, 2–5% being preferred in the case of nickel. It is also seen that not only are the catalysts prepared in accordance with this invention highly resistant to sulfur poisoning, but the finished catalysts are actually improved in isomerization activity by treatment with a hydrogen sulfide-containing atmosphere.

When a catalyst which has been fluorided in accordance with this invention is treated with a hydrogen sulfide-containing atmosphere, preferably a mixture of a major portion of hydrogen sulfide and a minor portion of hydrogen for a period of 0.1–10 hours, it has a higher isomerization activity than a catalyst which has not been subjected to treatment with hydrogen sulfide.

Catalysts prepared in accordance with this invention are useful in the isomerization of a variety of lower aliphatic hydrocarbons. In particular, the catalysts are useful in the isomerization of n-pentane and n-hexane, although n-heptane and n-octane may be isomerized using these catalysts (particularly the base metal catalysts). It is preferred that the hydrocarbon to be isomerized be as pure as possible, i.e., free of naphthenes and heavier hydrocarbons and have as low a sulfur content as possible. These catalysts, however, are highly resistant to sulfur poisoning and will tolerate sulfur contents in the range of 1–10 p.p.m. in the hydrocarbon feed, which concentrations of sulfur are sufficient to poison isomerization catalysts (at a relatively rapid rate) which have not been subjected to the treatment of this invention. In the case of group VIII noble metal-containing catalysts, such as palladium on silica-alumina (which has been fluorided in accordance with this invention), the preferred reaction conditions which provide a maximum isomerization activity and a minimum catalyst aging are a temperature of about 700°–790° F., a total pressure of about 100–1000 p.s.i.g., and a hydrogen/hydrocarbon mol ratio of about 0.5–5.0 (preferably about 2.0–3.5). The space velocity of the isomerization process is not critical. At high space velocities, the yield of isoparaffins is somewhat lower, while at low space velocities, maximum yields of isoparaffins are obtained. In the case of base metal-containing isomerization catalysts, such as nickel, reduced molybdate, molybdenum oxide, etc., on silica-alumina, the pressure and hydrogen/hydrocarbon mol ratios used are about the same, but the isomerization reaction must be carried out at a lower temperature, e.g., 650°–700° F. to effect a maximum isomerization with a minimum of hydrocracking.

While we have described our invention fully and completely with special emphasis upon several preferred embodiments of the invention, we wish it to be understood that within the scope of the appended claims, this invention may be practiced otherwise than as specifically described herein.

Wherever percentages are used in the specification, they are percentages by weight, unless otherwise specified. All vapor-phase, anhydrous hydrogen-fluoride treatments were carried out at about atmospheric pressure. The partial pressures of HF corresponding to 0.01–2.0 vol. percent HF are about 0.08 to 15.2 mm. mercury absolute.

The embodiments of the invention in which an exclusive property or privilege is claimed are defined as follows:

1. A method of preparing a sulfur-resistant isomerization catalyst which comprises reacting a catalyst support material consisting essentially of predried silica-alumina, containing 50–95% wt. silica, with anhydrous gaseous hydrogen fluoride at a temperature of 100°–1000° F., excepting the range from about 650°–850° F., until the silica-alumina contains 1–10% wt. combined fluorine, then impregnating the fluorided support material with a hydrogenation agent, and reducing the catalyst with hydrogen at about 750°–975° F.

2. A method in accordance with claim 1 in which the hydrogenation agent is a platinum group metal of platinum-group metals, nickel, cobalt, molybdenum oxide, and nickel molybdate, and the catalyst is activated by reduction with hydrogen at an elevated temperature.

3. A method in accordance with claim 2 in which a gaseous mixture comprising about 0.01–2.0% vol. hydrogen fluoride in an inert diluent gas is circulated over the catalyst support material until substantially the maximum amount of combined fluorine is obtained in the support for the reaction temperature used.

4. A method in accordance with claim 2 in which the reaction with hydrogen fluoride is carried out at about 100°–650° F.

5. A method in accordance with claim 2 in which the reaction with hydrogen fluoride is carried out at about 850°–1000° F.

6. A method in accordance with claim 2 in which the catalyst support material has been dried at about 400° F.

7. A method in accordance with claim 2 in which the fluorided catalyst is heated at 500°–1000° F. in contact with a hydrogen sulfide-containing atmosphere for 0.1 to 10 hours.

8. A method in accordance with claim 2 in which the hydrogen sulfide-containing atmosphere comprises a major proportion of hydrogen sulfide in a minor proportion of hydrogen.

9. A method of preparing a sulfur-resistant isomerization catalyst which comprises reacting a catalyst support material consisting essentially of a predried silica-alumina, containing 50–95% wt. silica, with anhydrous gaseous hydrogen fluoride at a temperature of 100°–1000° F., excepting the range from about 650°–850° F., until the silica-alumina contains 1–10% wt. combined fluorine, then impregnating the fluorided support material with a solution of a reducible palladium compound, drying the impregnated support, and reducing the catalyst with hydrogen at about 750°–975° F.

10. A method in accordance with claim 9 in which a gaseous mixture comprising about 0.01–2.0% vol. hydrogen fluoride in an inert diluent gas is circulated over the catalyst support material until substantially the maximum amount of combined fluorine is obtained in the support for the reaction temperature used.

11. A method in accordance with claim 9 in which the fluorided catalyst is heated at 500°–1000° F. and contacted with the hydrogen sulfide-containing atmosphere for about 0.1 to 10 hours.

12. A method in accordance with claim 11 in which the hydrogen sulfide-containing atmosphere comprises a major portion of hydrogen sulfide and a minor proportion of hydrogen.

13. A method in accordance with claim 9 in which the fluorided support is impregnated with about 0.3–0.8% wt. palladium.

14. An isomerization catalyst prepared in accordance with claim 1, characterized by resistance to sulfur poisoning.

15. An isomerization catalyst prepared in accordance with claim 11, characterized by resistance to sulfur poisoning.

16. An isomerization catalyst prepared in accordance with claim 13, characterized by resistance to sulfur poisoning.

17. A method of isomerizing a $C_5$–$C_6$ normal paraffin hydrocarbon without substantial decline in yield resulting from sulfur compounds in the feed, which comprises passing hydrogen and a normal $C_5$–$C_6$ paraffin hydrocarbon containing 0–10 p.p.m. sulfur, at a temperature of about 700°–790° F. sufficient to effect isomerization, a pressure of about 100–1000 p.s.i.g., and a hydrogen/hydrocarbon mol ratio of about 0.5–5.0 over the catalyst of claim 14.

18. A method of isomerizing a $C_5$–$C_6$ normal paraffin hydrocarbon without substantial decline in yield resulting from sulfur compounds in the feed, which comprises passing hydrogen and a normal $C_5$–$C_6$ paraffin hydrocarbon containing 0–10 p.p.m. sulfur, at a temperature of about 700°–790° F. sufficient to effect isomerization, a pressure of about 100–1000 p.s.i.g., and a hydrogen/hydrocarbon mol ratio of about 0.5–5.0 over the catalyst of claim 15.

19. A method of isomerizing a $C_5$–$C_6$ normal paraffin hydrocarbon without substantial decline in yield resulting from sulfur compounds in the feed, which comprises passing hydrogen and a normal $C_5$–$C_6$ paraffin hydrocarbon containing 0–10 p.p.m. sulfur, at a temperature of about 700–790° F. sufficient to effect isomerization, a pressure of about 100–1000 p.s.i.g., and a hydrogen/hydrocarbon mol ratio of about 0.5–5.0 over the catalyst of claim 16.

References Cited in the file of this patent

UNITED STATES PATENTS

| | | |
|---|---|---|
| 2,324,762 | Calhoun et al. | July 20, 1943 |
| 2,506,923 | Hoekstra | May 9, 1950 |
| 2,694,674 | Starr et al. | Nov. 16, 1954 |
| 2,766,302 | Elkins | Oct. 9, 1956 |
| 2,834,823 | Patton et al. | May 13, 1958 |
| 2,913,421 | Horne et al. | Nov. 17, 1959 |

UNITED STATES PATENT OFFICE

CERTIFICATE OF CORRECTION

Patent No. 3,024,294                                         March 6, 1962

Marcellus J. Geerts et al.

It is hereby certified that error appears in the above numbered patent requiring correction and that the said Letters Patent should read as corrected below.

Column 1, line 41, for "$C_1-C_5$" read -- $C_2-C_5$ --; column 8, line 23, beginning with "of" strike out all to and including "temperature" in line 26, same column 8.

Signed and sealed this 17th day of July 1962.

(SEAL)
Attest:

ERNEST W. SWIDER
Attesting Officer

DAVID L. LADD
Commissioner of Patents